(12) United States Patent
Abe (10) Patent No.: US 7,642,740 B2
(45) Date of Patent: Jan. 5, 2010

(54) SERVOMOTOR CONTROLLER (75) Inventor: Tomonori Abe, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 91 days.

(21) Appl. No.: 11/910,708

(22) PCT Filed: Apr. 8, 2005

(86) PCT No.: PCT/JP2005/006912

§ 371 (c)(1),
(2), (4) Date: Oct. 4, 2007

(87) PCT Pub. No.: WO2006/114843

PCT Pub. Date: Nov. 2, 2006

(65) Prior Publication Data

US 2009/0079379 A1    Mar. 26, 2009

(51) Int. Cl.
    G05B 11/32    (2006.01)
(52) U.S. Cl. ........................ 318/625; 318/432
(58) Field of Classification Search ............. 318/625, 318/432, 434, 461, 727
See application file for complete search history.

(56) References Cited

U.S. PATENT DOCUMENTS

| | | | | |
|---|---|---|---|---|
| 5,153,492 A | * | 10/1992 | Landseadel | 318/599 |
| 5,249,161 A | * | 9/1993 | Jones et al. | 367/83 |
| 6,385,500 B1 | * | 5/2002 | Hebbar et al. | 700/162 |
| 2003/0154041 A1 | * | 8/2003 | McGaughey et al. | 702/75 |

FOREIGN PATENT DOCUMENTS

| | | |
|---|---|---|
| JP | 2-76697 A | 3/1990 |
| JP | 5-137367 A | 6/1993 |
| JP | 2001-22446 A | 1/2001 |

* cited by examiner

*Primary Examiner*—Rina I Duda
(74) *Attorney, Agent, or Firm*—Sughrue Mion, PLLC

(57) ABSTRACT

A servomotor controller by which a load on a machine device can be reduced, and control capability can be stabilized as well as the resistance property for a temporary blackout or a temporary voltage drop can be more secured in accordance with driving conditions of the machine device and a motor load. The servomotor controller includes: a bus voltage detector for measuring a bus voltage, and a current detector for detecting current passing through a servomotor. A controller 9 switches, depending on the bus voltage, a position control operation with a velocity control operation, to decrease the current supplied to the servomotor in a case where the bus voltage is lower than a first predefined reference voltage.

5 Claims, 4 Drawing Sheets

SERVOMOTOR CONTROLLER

TECHNICAL FIELD

The present invention relates to servomotor controllers in a case where a power supply voltage decreases, and then the power supply voltage recovers.

BACKGROUND ART

As an example of conventional arts, an art described in Japanese Laid-Open Patent Publication 1998-124308 is disclosed (refer to Patent Document 1).

Regarding a control method of a conventional servomotor controller in a case where a power supply voltage falls off, in a device for driving joints of a robot body by servomotors that are disposed adjacent to the respective joints, the conventional art is described, in which each position of the joints can be accurately detected based on signals from a pulse encoder, even when the power supply voltage temporarily fails or abnormally falls off, by outputting an abnormal signal when an output voltage of a DC power supply serving as a servomotor driving power source supplied from a commercial power supply drops down to lower than a predefined value, and by stopping the servomotor, and by holding the stop position of the servomotor at that time.

[Patent Document 1]
Japanese Laid-Open Patent Publication 1990-76697

DISCLOSURE OF THE INVENTION

Problems to be Solved by the Invention

In a conventional servomotor controller for performing motor control operations in accordance with a command pulse count outputted from a positioning device being a controller, or the like, there have been problems in that an abnormal signal is outputted when a power supply voltage for driving a motor (hereinafter, referred to as a bus voltage) has dropped down to lower than a predefined voltage, and the motor control operation is temporarily stopped, so that some machines are stopped at a position that is not a predefined stop position, which leads to harmful effects such as damage on a machine or damage on a workpiece being machined.

Moreover, there has been a case in which a deviation of a motor position from a command value (hereinafter, referred to as a remaining-pulse value) increases, because the bus voltage falls off and the predefined voltage can not be applied to the motor depending on a machine load. In such a case, an upper limit of the remaining-pulse value is determined to protect the machine device, and when the deviation exceeds the upper limit, an abnormal signal is outputted, and a motor driving signal is turned off to stop the servo control operation.

Moreover, there has been a case in which when an temporary drop of the bus voltage has been caused during the motor operation, but the bus voltage recovers before the motor is stopped by an occurrence of the abnormal signal due to increase of the remaining-pulse value or the like, the motor is accelerated in order to reduce the remaining-pulse value to zero in a short time. In such a case, there has been a problem in that the machine device is excessively loaded by excessive current temporarily flowing through the motor.

To cope with the problems, in a semiconductor manufacturing factory in particular, operation time during which an operation of a device must be continued without stopping against a power-supply-voltage drop due to equipment fault or load variation is determined in the "SEMI-F47" standard or the like. In order to satisfy the standard, it is necessary to secure the resistance property for the temporary power-supply-voltage drop, such as a temporary blackout, by connecting an external capacitor or an uninterruptible power supply (UPS).

The present invention has been made in order to solve the above problems, and it is an object of the invention to obtain a servomotor controller in which a load on a machine device can be reduced, and control performance can be stabilized as well as the resistance property for a temporary blackout or the resistance property for an temporary voltage drop according to a driving condition of the machine device and a load on the servomotor can be more secured, by performing a servomotor control operation so as to decrease the load on the servomotor according to the bus voltage, when the bus voltage falls off.

Means for Solving Problems

The present invention comprises: a bus voltage detecting means for measuring a bus voltage converted from an AC power supply voltage into a DC voltage by rectifying and smoothing the AC voltage, to output a bus voltage signal; a current detecting means for detecting current passing through a servomotor, to output a current value signal; a control means for switching, depending on the bus voltage from the bus voltage signal, a position control operation with a velocity control operation, to output a control signal, in order to decrease the current supplied to the servomotor in a case where the bus voltage is lower than a first predefined reference voltage, by referring to a shaft position signal of the motor, which is information on the shaft position of the servomotor and outputted from an encoder provided for the servomotor, a position command, the bus voltage signal, and the current value signal; a drive control means for outputting a drive voltage based on the control signal; and a motor drive circuit for outputting predefined current to the servomotor based on the bus voltage and the drive voltage inputted from the drive control means.

EFFECTS OF THE INVENTION

The present invention comprises: a bus voltage detecting means for measuring a bus voltage converted from an AC power supply voltage into a DC voltage by rectifying and smoothing the AC voltage, to output a bus voltage signal; a current detecting means for detecting current passing through a servomotor, to output a current value signal; a control means for switching, depending on the bus voltage from the bus voltage signal, a position control operation with a velocity control operation, to output a control signal, in order to decrease the current supplied to the servomotor in a case where the bus voltage is lower than a first predefined reference voltage, by referring to a shaft position signal of the motor, which is information on the shaft position of the servomotor and outputted from an encoder provided for the servomotor, a position command, the bus voltage signal, and the current value signal; a drive control means for outputting a drive voltage based on the control signal; and a motor drive circuit for outputting predefined current to the servomotor based on the bus voltage and the drive voltage inputted from the drive control means, so that a servomotor controller can be obtained, by which a load on a machine device can be reduced, and control capability can be stabilized as well as resistance property for an temporary blackout and the resistance property for an temporary voltage drop can be more obtained in accordance with a driving condition of the machine device and a load on the servomotor, by switching servomotor control operations, in a case where the bus voltage decreases, to decrease the load on the servomotor depending on the bus voltage.

DESCRIPTION OF THE SYMBOLS

"1" is an AC power supply; "2" is a rectifier circuit; "3" is a smoothing capacitor; "4" is a bus voltage detecting means; "5" is a servomotor; "5a" is a motor unit; "5b" is an encoder unit; "6" is a drive control means; "7" is a motor drive circuit; "7a" is a transistor; "7b" is a diode; "8" is a servo controller; "9" is a control means; "9a" is a comparison computing unit; "9b" is a memory; "9c" is a control unit; "9d" is a bus-voltage-reference-value storage unit; "9e" is a predefined-time-reference-value storage unit; "9f" is a remaining-pulse-reference-value storage unit; "9g" is a position controller; "9h" is a velocity controller; "9i" is a controller; "9j" is a converter; "9k" is a converter; and "10" is a current detecting means.

BEST MODE FOR CARRYING OUT THE INVENTION

The best mode for carrying out of the invention will be explained in Embodiment 1.

Embodiment 1

Figure 1:
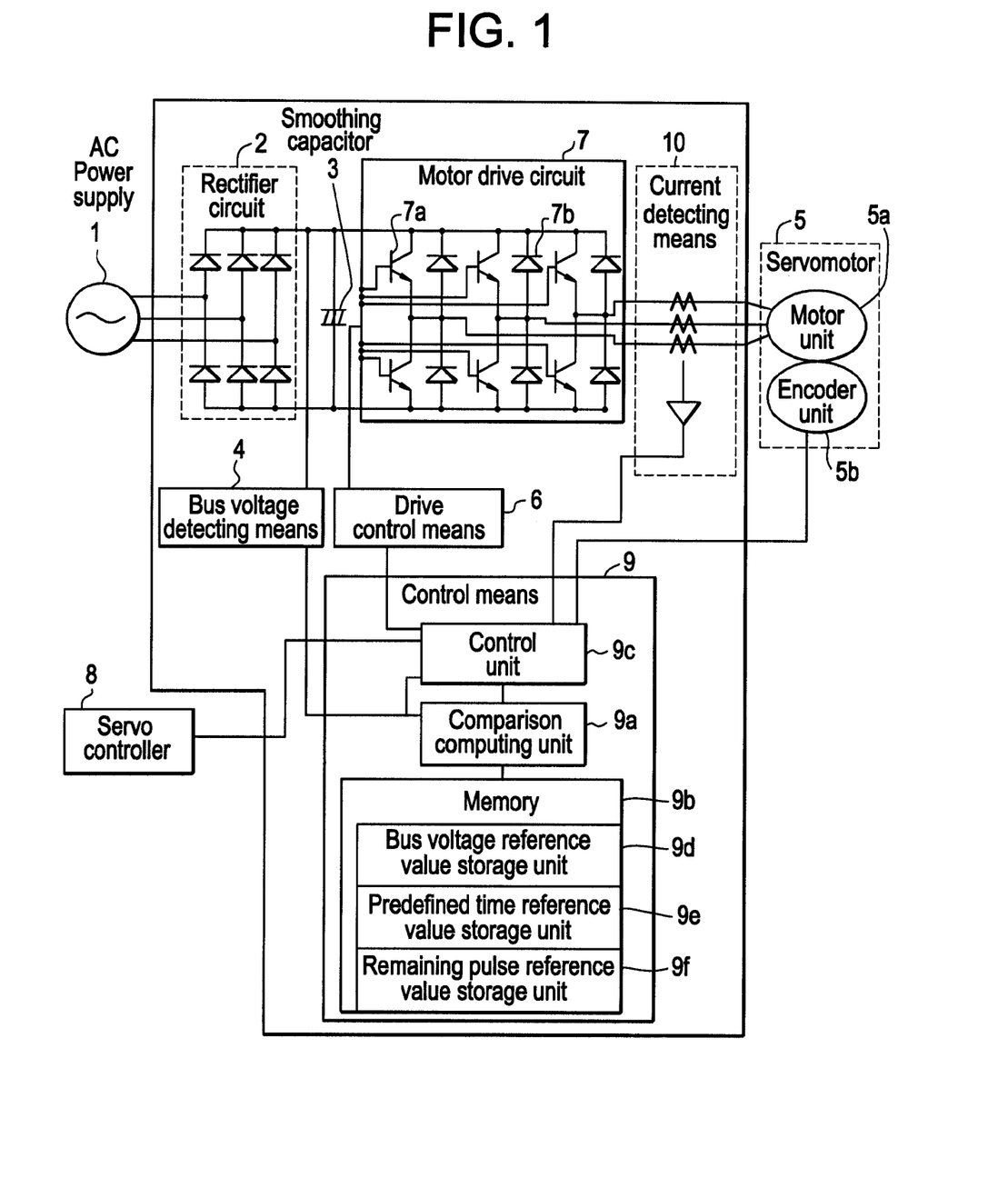
FIG. 1 is a configuration diagram illustrating a servomotor controller according to Embodiment 1 of the present invention.

FIG. 1 is a configuration diagram illustrating a servomotor controller according to Embodiment 1 of the present invention.

In FIG. 1, a rectifier circuit 2 converts AC power from an AC power supply 1 into DC power. In FIG. 1, in order to convert a three-phase AC voltage into a DC voltage, two diodes are connected in series, as a pair, and three such pairs are arranged in parallel in the rectifier circuit 2. However, in a case where a single-phase AC voltage is converted into a DC voltage, the rectifier circuit can be configured by a bridge rectifier circuit, and in a case where a voltage that is several times higher than a single-phase AC voltage is needed, the rectifier circuit can be configured by a full-wave-multiplying-voltage rectifier circuit or a multistep-multiplying-voltage rectifier circuit.

A smoothing capacitor 3 is wired in parallel with the rectifier circuit 2 and smoothes the DC voltage that is rectified by the rectifier circuit 2. The smoothing capacitor 3 also charges DC power in order to respond to a case where the rectified-DC voltage is temporarily decreases. Hereinafter, the smoothed voltage is referred to as a bus voltage. Moreover, a bus voltage detecting means 4 is provided to detect a voltage value of the bus voltage.

A motor drive circuit 7 for driving a motor based on a drive voltage outputted from a drive control means 6 is arranged in parallel with the smoothing capacitor 3. The motor drive circuit 7 is composed of transistors 7a and diodes 7b. In Embodiment 1, because the servomotor is a three-phase motor, three pairs of bridge-circuits are configured in parallel. Each of three wires connected with the output side of the motor drive circuit 7 is connected to each of phases of a servomotor 5. The servomotor 5 is composed of a motor unit 6a and an encoder 5b for detecting a position of a motor shaft.

Position commands, such as a command pulse count corresponding to a shift position of a machine or an operation pattern, outputted from a servo controller 8, are inputted into a control means 9. The control means 9 performs a process for outputting control signal for driving the servomotor 5 depending on a deviation of a position command with respect to a shaft-position signal of the motor, based on the position command, as well as based on a bus voltage signal that is information on a bus voltage value and is outputted from a bus voltage detecting means 4; the motor-shaft-position signal that is information on a motor shaft position of the servomotor 5 and is detected and outputted from the encoder unit 5b of the servomotor 5; and the current value signal that is information on a current value and is detected, by a current detecting means 10, from a wire between the motor drive circuit 7 and the servomotor 5. The control signal outputted from the control means 9 is inputted into the drive control means 6. The drive control means 6 outputs based on the control signal drive voltages to the respective transistors 7a, in order to drive the servomotor 5 in three-phase mode.

The control means 9 includes a comparison computing unit 9a for judging to which control mode for the servomotor 5 should be switched depending on a bus-voltage-signal value, a memory 9b for storing predefined data, and a motor control unit 6c for performing a plurality of methods of controlling the servomotors 5. The memory 9b includes a bus-voltage-reference-value storage unit 9d for storing a plurality of bus-voltage-reference values, a predefined-time-reference-value storage unit 9e for storing a predefined-time-reference value to perform for a predefined time the motor control, in a case where the bus voltage decreases, and a remaining-pulse-reference-value storage unit 9f for storing a plurality of remaining-pulse-reference values including upper limit values of deviation of the position-command value with respect to the actual motor position, in a case where the bus voltage decreases.

Figure 2:
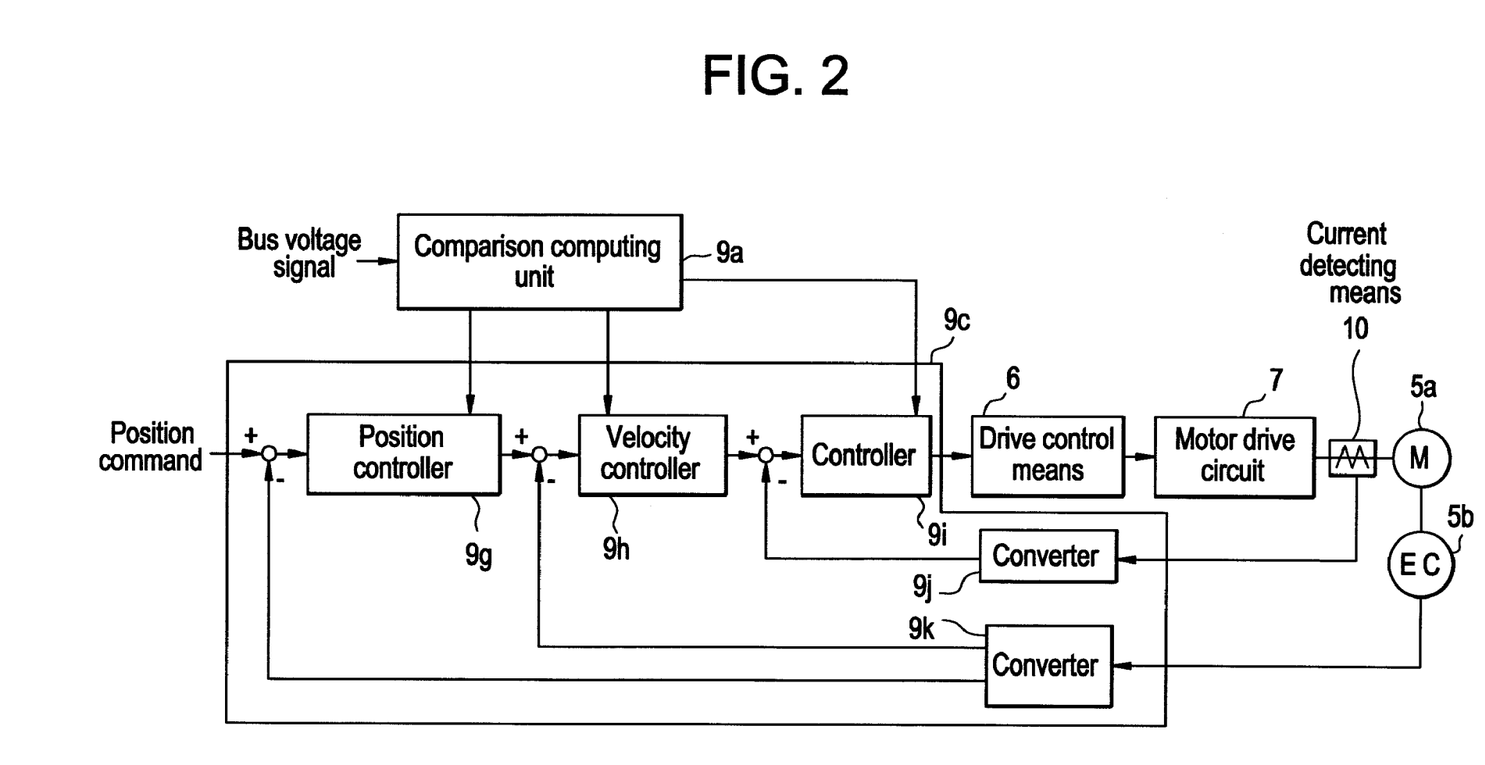
FIG. 2 is a control block diagram illustrating the servomotor controller according to Embodiment 1 of the present invention.

FIG. 2 is a control block diagram illustrating the servomotor controller according to Embodiment 1 of the present invention. A position command from the servo controller 8 is inputted into the control unit 9c. A deviation of the motor-shaft-position signal, which is outputted from an encoder 5b for detecting the shaft position of the servomotor 5a and converted by the converter 9k so as to be adapted to the control unit 9c, with respect to the position command signal is multiplied with a predefined multiplier factor by the position controller 9g, and then, the signal deviation is converted into a velocity deviation by subtracting a motor shaft velocity signal converted by the converter 9k. The velocity deviation is multiplied with a predefined multiplier factor by the velocity controller 9h, and is converted into a current deviation by subtracting a current value, which is detected by the current detecting means 10 and converted by a converter 9j so as to be adapted to the control unit 9c. The current deviation is converted using a predefined conversion method by a controller 9i, and then outputted as a control signal to the drive control means 6. The drive control means 6 outputs a drive voltage, and the drive voltage is inputted into the drive circuit 7. Then, the drive circuit 7 supplies a predefined current to each phase of the servomotor 5 based on the drive voltage, so that the servomotor 5 is controlled. On this occasion, the comparison computing unit 9a, in which the bus voltage signal has been inputted, outputs, depending on the value of the bus voltage signal, a command regarding the multiplier or the conversion formula, to the position controller 9g, the velocity controller 9h, or the controller 9i.

Hereinafter, a control method, in a case where a bus voltage decreases, will be explained.

Figure 3:
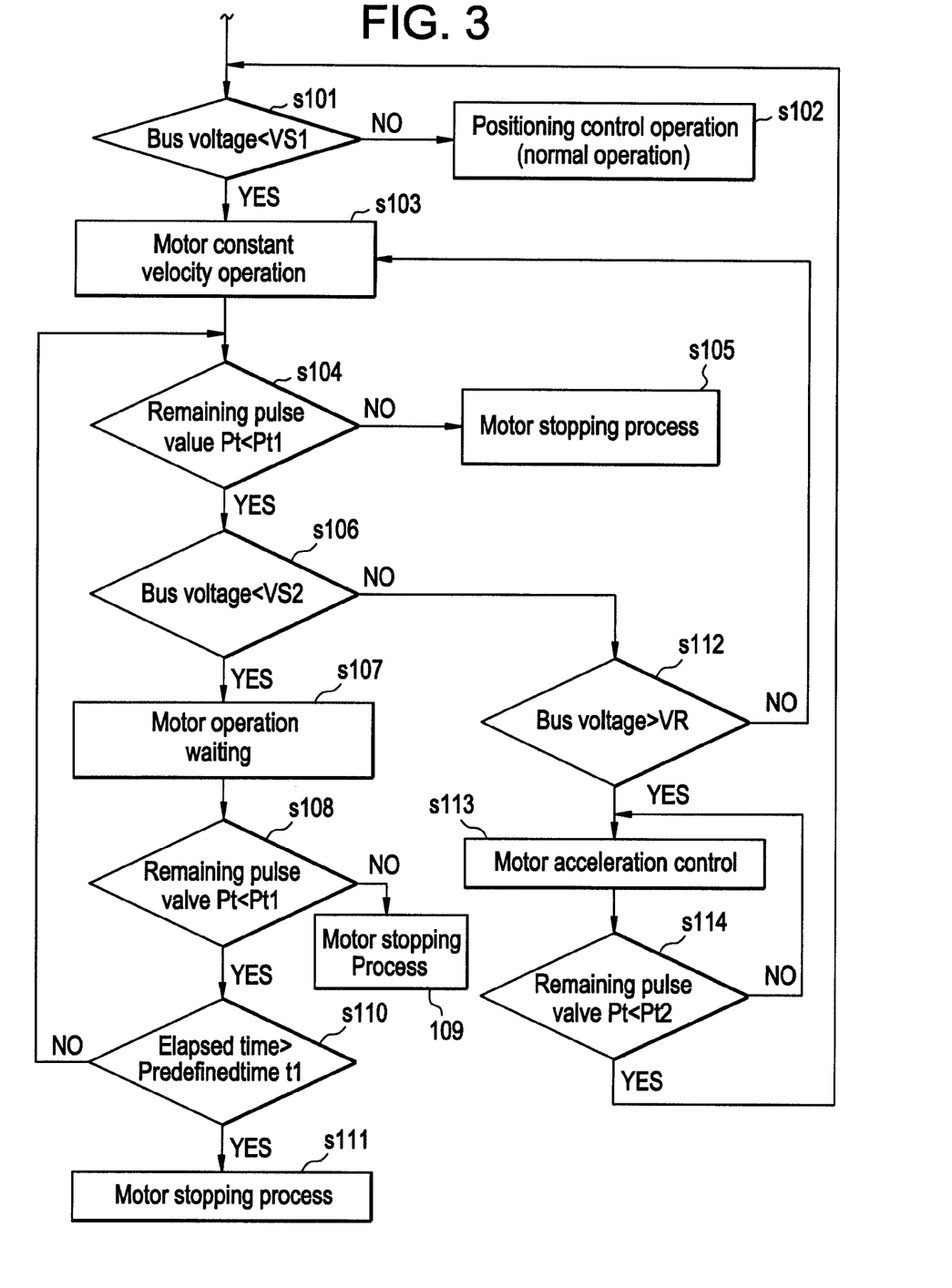
FIG. 3 is a flow chart illustrating a control method for the servomotor according to Embodiment 1 of the present invention, in a case where a bus voltage decreases.

FIG. 3 is a flow chart, illustrating a servomotor control method, in a case where a bus voltage decreases, according to Embodiment 1 of the present invention.

Regarding the flow chart, a plurality of bus-voltage-reference values for changing the control of the servomotor 5 in accordance with the decrease of the bus voltage from the inputted bus voltage signal is defined in the control circuit 9 according to Embodiment 1, and those values have been stored in the memory 9b. Firstly, a first predefined-reference voltage VS1 for judging whether a motor control operation that is different from the normal position control operation should be performed or not, and a second predefined-reference voltage VS2 for judging whether the motor control operation should be stopped or not, and a recovering-reference voltage VR for judging whether an acceleration control operation for recovering to the normal motor control operation should be performed or not when the power supply recovers, can be set to be the bus-voltage-reference values.

A control method in the computing unit 9a according to Embodiment 1, in a case where a bus voltage decreases, will be explained by using FIG. 3.

Firstly, the bus voltage from the bus voltage signal, which is detected and outputted from the bus voltage detecting means 4, is compared with the first predefined-reference voltage VS1 (s101). If the bus voltage is higher than the first predefined-reference voltage VS1, the comparison computing unit 9a outputs a command for performing a normal positioning-servomotor-control operation following the position command (s102), and the control unit 9c performs a position-control operation of the motor shaft of the servomotor 5, based on the command. If the bus voltage is lower than the first predefined-reference voltage VS1, the comparison computing unit 9a does not follow the position command, and outputs a command, for performing a constant-velocity-control operation of the motor with a predefined rotation velocity, to the servomotor 5 (s103), and the control unit 9c performs a velocity-control operation of the servomotor 5 based on the command.

If the position control of the servomotor 5 is continued when the bus voltage is lower than the first predefined-reference voltage VS1, a phenomenon is caused, in which the current supplied to the servomotor 5 increases depending on the deviation when the deviation increases, and the bus voltage further deceases. Generally, the energy supplied to the motor in acceleration increases temporarily and reaches a value which is about 200% to 300% of the energy in a stationary time. In contrast, in a case where the bus voltage is lower than the first predefined-reference voltage VS1, by changing the control operation of the servomotor 5 to the velocity control operation, a rotational velocity of the servomotor 5 in the constant velocity control is automatically determined depending on a load on the servomotor 5, so that energy supplied to the servomotor 5 becomes approximately constant and the increase of the control current can be controlled, and further temporary decrease of the bus voltage can be prevented. Moreover, an effect can be obtained in which it is avoided that acceleration of decreasing of the bus voltage leads to shortening a time before the motor becomes uncontrollable.

In this case, a first remaining-pulse-reference-value Pt1, which has been predefined as a remaining-pulse-reference value, is set to be an upper limit of a remaining-pulse value in the comparison computing unit 9a. When the bus voltage is lower than the first predefined-reference voltage VS1 and the servomotor 5 is controlled in a constant velocity, the first remaining-pulse-reference-value Pt1 is compared with a remaining-pulse value, as a deviation of the motor shaft position, based on the motor-shaft-position signal outputted from the encoder unit 5b of the servomotor 5, with respect to the position command from a positioning device being a servomotor controller connected to the control means 9, or the like (s104), and if the remaining-pulse value is greater than the first remaining-pulse-reference-value Pt1, the comparison computing unit 9a outputs a command for stopping the motor operation (s105), and the control unit 9c stops the operation of the servomotor 5 based on the command. Specifically, for example, if the comparison computing unit 9a outputs the command for stopping the motor operation, the controller 9i in the control unit 9c outputs a value 0 as a current deviation. In a case where the bus voltage recovers completely in a state where the remaining-pulse value is greater than the first remaining-pulse-reference-value Pt1, a trouble of destroying a controlled object, which is caused by overshooting or the like after the acceleration operation is started, can be avoided, and instability of the bus voltage, in a case where the bus voltage decreases again by an overload, can be avoided.

If the remaining-pulse value is lower than the first remaining-pulse-reference-value Pt1, and the bus voltage further decreases and gets lower than the second predefined-reference voltage VS2 (s106), the comparison computing unit 9a outputs a command for suspending the motor operation (s107), and the control unit 9c suspends the operation of the servomotor 5 based on the command.

Then, the comparison computing unit 9a compares the remaining-pulse value with the first remaining-pulse-reference-value Pt1 (s108), and if the remaining-pulse value is greater than the first remaining-pulse-reference-value Pt1, the comparison computing unit 9a outputs the command for stopping the motor operation (s109), and the control unit 9c stops the operation of the servomotor 5, based on the command.

Moreover, if the remaining-pulse value is not greater than the first remaining-pulse-reference-value Pt1 in s108, and if the elapsed time after the operation of the servomotor 5 is suspended has exceeded the predefined time t1 (s110), the comparison computing unit 9a outputs the command for stopping the motor operation (s111), and the control unit 9c stops the operation of the servomotor 5 based on the command.

If the elapsed time has not exceeded the predefined time t1, the process step returns to s104, and the process loop from s104 to s110 is repeated if the conditions do not change, and in contrast, if the bus voltage gets higher than the second predefined-reference voltage VS2, the following process is performed.

In s106, if the bus voltage is higher than the second predefined-reference voltage VS2, the comparison computing unit 9a compares the bus voltage detected by the bus voltage detecting means 4 with the recovering-reference voltage VR (s112). If the bus voltage is lower than the recovering-reference voltage VR, the comparison computing unit 9a outputs a command for performing a constant-velocity-control operation of the motor (s103), and the control unit 9c performs a velocity-control operation of the servomotor 5 based on the command.

If the bus voltage is higher than the recovering-reference voltage VR, the comparison computing unit 9a outputs a command for performing an acceleration-control operation (s113), and the control unit 9c performs an acceleration-control operation of the servomotor 5 based on the acceleration-control command. The acceleration-control operation of the motor is set to be a control operation by which the motor is controlled under the predefined acceleration condition until the deviation of the motor shaft position with respect to the position command becomes lower than a second remaining-pulse-reference-value Pt2, and the control operation by which the deviation of the motor shaft position with respect to the position command decreases gradually.

When the acceleration control operation of the motor is continued and the remaining-pulse value gets lower than the second remaining-pulse-reference-value Pt2, the comparison computing unit 9a outputs a command for performing a position-control operation (s114), and the control unit 9c performs, based on the command, positioning-servo-operation control as normal position control of the servomotor 5.

Next, a control aspect in an actual operation will be explained.

Figure 4:
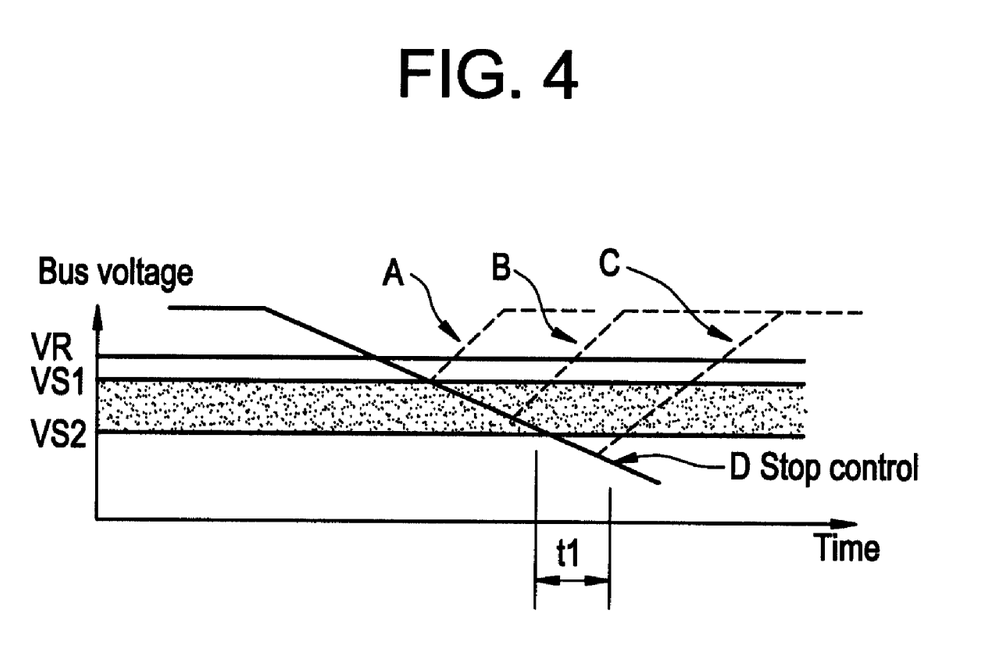
FIG. 4 is a diagram illustrating an aspect of the servomotor controller according to Embodiment 1 of the present invention, in a case where a bus voltage decreases.

FIG. 4 is a diagram illustrating an aspect of the servomotor controller according to Embodiment 1 of the present invention, in a case where a bus voltage decreases. The vertical axis indicates the bus voltage, and the horizontal axis indicates the time.

When the bus voltage decreases and recovers at a voltage that is higher than the first predefined-reference voltage VS1, in other words, when the bus voltage varies along the dotted line "A" in FIG. 4, the servomotor 5 continues a normal positioning-servomotor-operation control including a position-control operation.

In addition, the first predefined-reference voltage is set to be the voltage by which the normal position-control operation can be performed even when the servomotor 5 is operated with the maximum load. In other words, if the first predefined-reference voltage is set to be the voltage by which the normal position-control operation can be performed even when the servomotor 5 is operated with the maximum load, if the voltage actually decreases, the remaining pulse value does not rapidly increase or decrease, and the control operation is not affected. Therefore, the first predefined-reference voltage VS1 depends on a load that is assumed in a system where the motor is actually used. Generally, for example, if the maximum load of the servomotor 5 is about 300 percent of the rated load, the first predefined-reference voltage VS1 is set to be the voltage that is about 85 percent of the bus voltage in a normal state.

Moreover, when the bus voltage decreases to be lower than the first predefined-reference voltage VS1 and recovers at a voltage that is higher than the second predefined-reference voltage VS2, in other words, when the bus voltage has varied along the dotted line "B" in FIG. 4, if the remaining pulse value is lower than the first remaining-pulse-reference-value Pt1, the constant velocity-control operation is performed until the bus voltage recovers to the recovering-reference voltage VR. Furthermore, when the bus voltage gets higher than the recovering-reference voltage VR, the motor-acceleration-control operation, by which the deviation of the motor shaft position with respect to the position command decreases gradually, is performed, and the normal positioning-servo-operation control including the position-control operation is restarted when the remaining pulse value gets lower than the second remaining-pulse-reference-value Pt2.

In addition, in a case where the acceleration-control operation of the servomotor 5 is started and the bus voltage is decreased by the current passing the servomotor 5, the value of the recovering-reference voltage VR is set to a value by which, even though that decrease is taken into consideration, the bus voltage will not be lower than the first predefined-reference voltage VS1. In other words, even if the servomotor 5 is used with the maximum load according to the acceleration-control operation of the servomotor 5, if the bus voltage is kept within a voltage value range in which the normal position-control operation can be performed, the remaining pulse value does not rapidly increase or decrease, and the control operation is not affected. Therefore, the recovering-reference voltage VR is sometimes set to a comparable level of the normal bus voltage value, in consideration of a case where, in general, the bus-voltage decrease becomes about 15 percent with respect to the bus voltage.

Moreover, in a case where the constant-velocity-control operation of the servomotor 5 is performed, when, for example, the acceleration-control operation is started because the remaining pulse value decreases to a value below the first remaining-pulse-reference-value Pt1, the first remaining-pulse-reference-value Pt1 is set to be a value by which the remaining pulse value can converge below the second remaining-pulse-reference-value Pt2. Therefore, the first remaining-pulse-reference-value Pt1 depends on conditions of the system, especially on the defined acceleration for the acceleration control operation, or the like.

Furthermore, in a case where the acceleration-control operation of the servomotor 5 is performed, when, for example, the normal positioning-servo-operation control including the position-control operation is restarted because the remaining pulse value decreases to a value lower than the second remaining-pulse-reference-value Pt2, the second remaining-pulse-reference-value Pt2 is set to be a value by which the current value supplied to the servomotor 5 in accordance with a control multiplier that is determined by the remaining pulse value, the velocity, and the acceleration at that time is not drastically varied when restarting, and then the current fluctuation is kept within a predefined value range.

When the bus voltage has further decreased and becomes lower than the second predefined-reference voltage VS2, and the bus voltage has recovered to the voltage that is higher than the second predefined-reference voltage VS2 within a predefined time t1 after the bus voltage has decreased below the second predefined-reference voltage VS2, in other words, when the bus voltage has been changed along the dotted line "C" in FIG. 4, and if the remaining pulse value is lower than the first remaining-pulse-reference-value Pt1, the constant velocity-control operation is continued until the bus voltage recovers to the recovering-reference voltage VR. The acceleration-control operation of the motor is performed in which the deviation of the motor shaft position with respect to the position command value decreases gradually when the bus voltage further increases and becomes higher than the recovering-reference voltage VR, and when the remaining pulse value becomes lower than the second remaining-pulse-reference-value Pt2, the normal positioning-servo-operation control including a position-control operation is restarted. However, if the bus voltage has not recovered to the voltage that is higher than the second predefined-reference voltage VS2 within the predefined time t1, in other words, if the bus voltage has been changed along the line "D" in FIG. 4, the control operation is stopped.

In addition, the second predefined-reference voltage VS2 set to be a value by which the constant velocity-control operation of the servomotor 5 with the rated load can be performed. Although the second predefined-reference voltage VS2 differs depending on the conditions of the system, the value of the voltage is set to be a value that does not flow the extra current through the servomotor 5, and secures the predefined constant velocity operation of the servomotor 5. Generally, the second predefined-reference voltage VS2 is set to be the voltage that is about 65 percent of the bus voltage.

In addition, in FIG. 2, in a case of basic position/velocity control operation, when the comparison computing unit 9a outputs a command based on the position command value, which is related to the multiplier factor or the conversion formula, to the position controller 9b, to the velocity controller 9h, or to the controller 9i, if, for example, a constant velocity control operation is performed, the servomotor 5 is controlled by several control methods in which the control multiplier factor may be set to 0, or the current deviation may be directly changed to a predefined value by the controller 9i. In a waiting or stopping operation, the most direct operation may be performed by changing the current deviation by the controller 9i. In an accelerating operation, a predefined value of the current deviation may be set by the controller 9i, or a calculation formula, by which a predefined value is outputted, may be applied by using the control multiplier factor of the velocity controller 9h, or other various applications may be applied.

In the positioning-servo controller configured as described above, the total cost reduction of the machine system can be achieved, because the motor-control operation can be changed depending on the bus voltage in a case where the bus voltage decreases, and the decrease range of the bus voltage supplied to the servomotor 5 can be repressed in a minimum value, and the resistance property for a temporary blackout or an temporary voltage drop can be easily obtained without connecting an external capacitor or an uninterruptible power supply (UPS).

Therefore, the present invention according to Embodiment 1 comprises: the bus voltage detecting means 4 for measuring the bus voltage converted from the voltage of AC power supply 1 into the DC voltage by rectifying and smoothing the AC voltage, to output the bus voltage signal; the current detecting means 10 for detecting current passing through the servomotor 5, to output a current value signal; the control means 9 for switching, depending on the bus voltage from the bus voltage signal, a position control operation with a velocity control operation, to output a control signal, in order to decrease the current supplied to the servomotor 5 in a case where the bus voltage is lower than a first predefined reference voltage, by referring a shaft position signal of the motor, which is information on the shaft position of the servomotor 5 and outputted from the encoder 5b provided for the servomotor 5, a position command, the bus voltage signal, and the current value signal; the drive control means 6 for outputting a drive voltage based on the control signal; and the motor drive circuit 7 for outputting predefined current to the servomotor based on the bus voltage and the drive voltage inputted from the drive control means 6, so that a servomotor controller can be obtained, a load on a machine device can be reduced, and control capability can be stabilized as well as the resistance property for an temporary blackout or an temporary voltage drop can be more obtained in accordance with a driving condition of the machine device and a load on the servomotor, by changing control operations arbitrarily, in a case where the bus voltage decreases, to decrease the load on the servomotor depending on the bus voltage.

In the positioning-servo controller, according to Embodiment 1, configured as described above, the total cost reduction of the machine device can be achieved, because the motor-control operation can be changed depending on the bus voltage, in a case where the bus voltage decreases, the decrease range of the bus voltage supplied to the motor can be repressed in a minimum value, and the resistance property for an temporary blackout or an temporary voltage drop can be easily obtained without connecting an external capacitor or an uninterruptible power supply (UPS).

Moreover, a constant velocity-control range and a stop range can be set depending on a power-supply-voltage condition and a machine load, and reduction of the machine load and maintenance of the stable control performance can be easily achieved.

Furthermore, reduction of the machine load and constant maintenance of the control function can be easily achieved, because a recovering-reference voltage can be set, and a motor-acceleration-control operation during the power recovery can be determined according to operation conditions.

In addition, in Embodiment 1, although the basic position/velocity-control operation is described in FIG. 2, the comparison computing unit 9a may output a command to a control unit in a feedforward control step in a case where, for example, the feedforward control step is included.

INDUSTRIAL APPLICABILITY

A servomotor controller related to the present invention is suitable for a case where control stability is needed when a power supply voltage decreases temporarily.

What is claimed is:

1. A servomotor controller, comprising:
    a bus voltage detecting means for measuring a bus voltage converted from an AC power supply voltage into a DC voltage by rectifying and smoothing the AC voltage, to output a bus voltage signal;
    a current detecting means for detecting current passing through a servomotor, to output a current value signal;
    a control means for switching, depending on the bus voltage from the bus voltage signal, a position control operation with a velocity control operation, to output a control signal, in order to decrease the current supplied to the servomotor in a case where the bus voltage is lower than a first predefined reference voltage, by referring to a shaft position signal of the motor, which is information on the shaft position of the servomotor and outputted from an encoder provided for the servomotor, a position command, the bus voltage signal, and the current value signal;
    a drive control means for outputting a drive voltage based on the control signal; and
    a motor drive circuit for outputting predefined current to the servomotor based on the bus voltage and the drive voltage inputted from the drive control means.

2. A servomotor controller as recited in claim 1, wherein the control means includes:
    a comparison computing unit for judging whether or not the bus voltage detected by the bus voltage detecting means is higher than the first predefined reference voltage, and for judging whether or not the bus voltage is higher than a second predefined reference voltage being set to be lower than the first predefined reference voltage; and
    a control unit for performing a position control operation in a case where the bus voltage is higher than the first predefined reference voltage, and for performing a constant velocity control operation in a case where the bus voltage is lower than the first predefined reference voltage and higher than the second predefined reference voltage.

3. A servomotor controller as recited in claim 2, wherein
the comparison computing unit judges whether or not the bus voltage has decreased lower than the second predefined reference voltage, whether or not a predefined time has passed, the bus voltage remaining lower than the second predefined reference voltage, and whether or not the bus voltage has increased higher than the second predefined reference voltage within the predefined time; and the control unit performs a control operation to hold the servomotor in a waiting state in a case where the bus voltage is lower than the second predefined reference voltage, and performs a control operation to stop the servomotor in a case where a predefined time has passed, the bus voltage remaining lower than the second predefined reference voltage, and performs a constant velocity control operation in a case where the bus voltage has increased higher than the second predefined reference voltage within the predefined time.

4. A servomotor controller as recited in claim 2, wherein
the comparison computing unit judges whether or not the bus voltage is higher than a recovering-reference voltage set to be higher than the first predefined reference voltage; and the control unit judges to perform an acceleration control operation of the servomotor, by predefined acceleration, in a direction of reducing a deviation of the shaft position of the servomotor with respect to the position command, in a case where the bus voltage is higher than the recovering-reference voltage set to be higher than the first predefined reference voltage.

5. A servomotor controller as recited in claim 4, wherein the control unit performs a position control operation based on the position command, in a case where the deviation of the shaft position of the motor in the shaft position signal of the servomotor with respect to the position command has decreased lower than a predefined value, after the control unit has performed the acceleration control operation of the servomotor.

* * * * *